(12) United States Patent
Janzen et al.

(10) Patent No.: US 7,141,283 B2
(45) Date of Patent: Nov. 28, 2006

(54) FASTENERS

(75) Inventors: Daniel Lee Janzen, Brampton (CA); Kevin Keith Line, Port Severn (CA); Paul Joseph Voigt, Waterdown (CA)

(73) Assignee: Velcro Industries B.V., Curacao, ANX ( * ) Notice: Subject to any disclaimer, the term of this patent is extended or adjusted under 35 U.S.C. 154(b) by 81 days.

(21) Appl. No.: 10/785,859

(22) Filed: Feb. 24, 2004

(65) Prior Publication Data

US 2005/0186385 A1 Aug. 25, 2005

(51) Int. Cl.
*B32B 1/08* (2006.01)
*A44B 18/00* (2006.01)

(52) U.S. Cl. .......... 428/36.9; 428/57; 428/58; 428/100; 24/442; 24/452

(58) Field of Classification Search ............. 428/36.9, 428/57, 58, 99, 100; 24/442, 452
See application file for complete search history.

(56) References Cited

U.S. PATENT DOCUMENTS

| | | |
|---|---|---|
| 2,461,201 A | 2/1949 | Ellis |
| 4,183,121 A | 1/1980 | Cousins |
| 4,198,734 A | 4/1980 | Brumlik |
| 4,271,566 A | 6/1981 | Perina |
| 4,557,024 A | 12/1985 | Roberts et al. |
| 4,680,838 A | 7/1987 | Astl |
| 4,775,310 A | 10/1988 | Fischer |
| 4,863,127 A | 9/1989 | Handler |
| 4,879,854 A | 11/1989 | Handler |
| 4,887,338 A | 12/1989 | Handler |
| 4,887,339 A | 12/1989 | Bellanger |
| 5,005,242 A | 4/1991 | Kennedy et al. |
| 5,101,539 A | 4/1992 | Kennedy et al. |
| 5,208,952 A | 5/1993 | Mintel et al. |
| 5,216,784 A | 6/1993 | Dyer |
| 5,368,549 A | 11/1994 | McVicker |
| 5,499,859 A | 3/1996 | Angell |
| 5,605,373 A | 2/1997 | Wildern, IV et al. |
| 5,653,004 A | 8/1997 | Russo |
| 5,657,516 A | 8/1997 | Berg et al. |
| 5,704,480 A | 1/1998 | Scholz et al. |
| 5,766,723 A | 6/1998 | Oborny et al. |
| 5,826,312 A | 10/1998 | Schroder et al. |
| 5,827,547 A | 10/1998 | Burchi et al. |
| 5,882,073 A | 3/1999 | Burchi et al. |
| 5,909,801 A | 6/1999 | Coffman |
| 5,945,193 A | 8/1999 | Pollard et al. |

(Continued)

FOREIGN PATENT DOCUMENTS

DE 103 18 432 A1 11/2003

(Continued)

*Primary Examiner*—Alexander S. Thomas
(74) *Attorney, Agent, or Firm*—Fish & Richardson P.C.

(57) ABSTRACT

Fastener components, and method of making fastener components for securing loop-carrying members are disclosed. The fastener component includes a tubular structure, and a plurality of discrete projections extending from a surface of the tubular structure. Each projection includes a molded stem of resin integral with the surface from which the projection extends, and a loop-engageable head formed at a distal end of the stem to overhang the surface. A majority of the projections are directed away from a common, open longitudinal end of the tubular structure to allow longitudinal overlap of the fastener component with a complementary loop-carrying member received from the longitudinal end, but to resist subsequent removal of the loop-carrying member toward the longitudinal end due to engagement of the projections.

26 Claims, 14 Drawing Sheets

U.S. PATENT DOCUMENTS

| | | |
|---|---|---|
| 5,953,797 A | 9/1999 | Provost et al. |
| 5,964,017 A | 10/1999 | Roberts |
| 6,129,970 A | 10/2000 | Kenney et al. |
| 6,339,865 B1 * | 1/2002 | Takahashi et al. ........ 24/136 R |
| 6,432,339 B1 | 8/2002 | Jens et al. |
| 6,668,429 B1 | 12/2003 | Fujisawa et al. |
| 2002/0078536 A1 | 6/2002 | Martin et al. |

FOREIGN PATENT DOCUMENTS

| | | |
|---|---|---|
| JP | 7-186160 | 7/1995 |
| WO | WO 00/07792 | 2/2000 |
| WO | WO 00/18556 | 4/2000 |
| WO | WO 01/12022 | 2/2001 |
| WO | WO 01/37710 | 5/2001 |

* cited by examiner

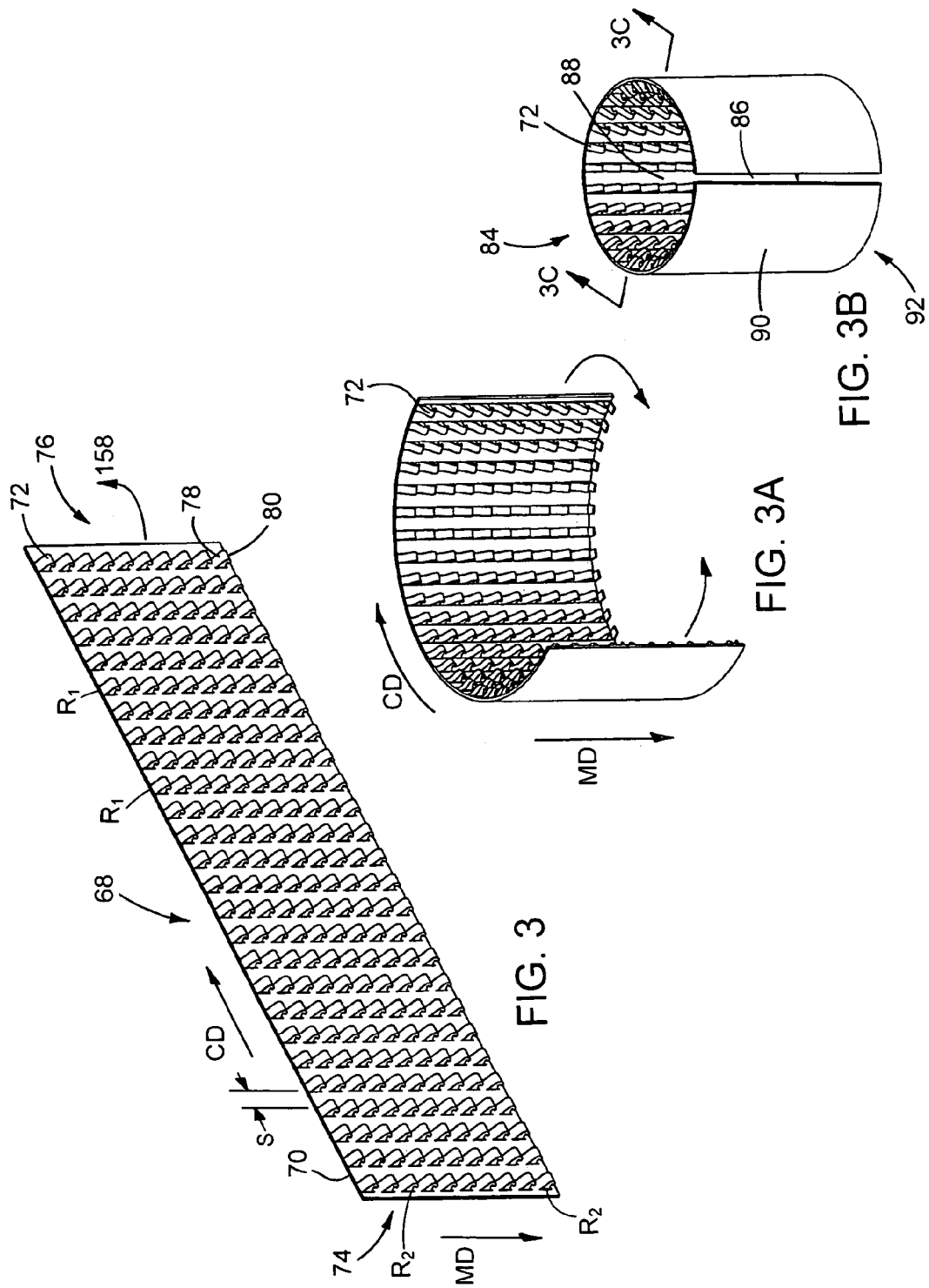

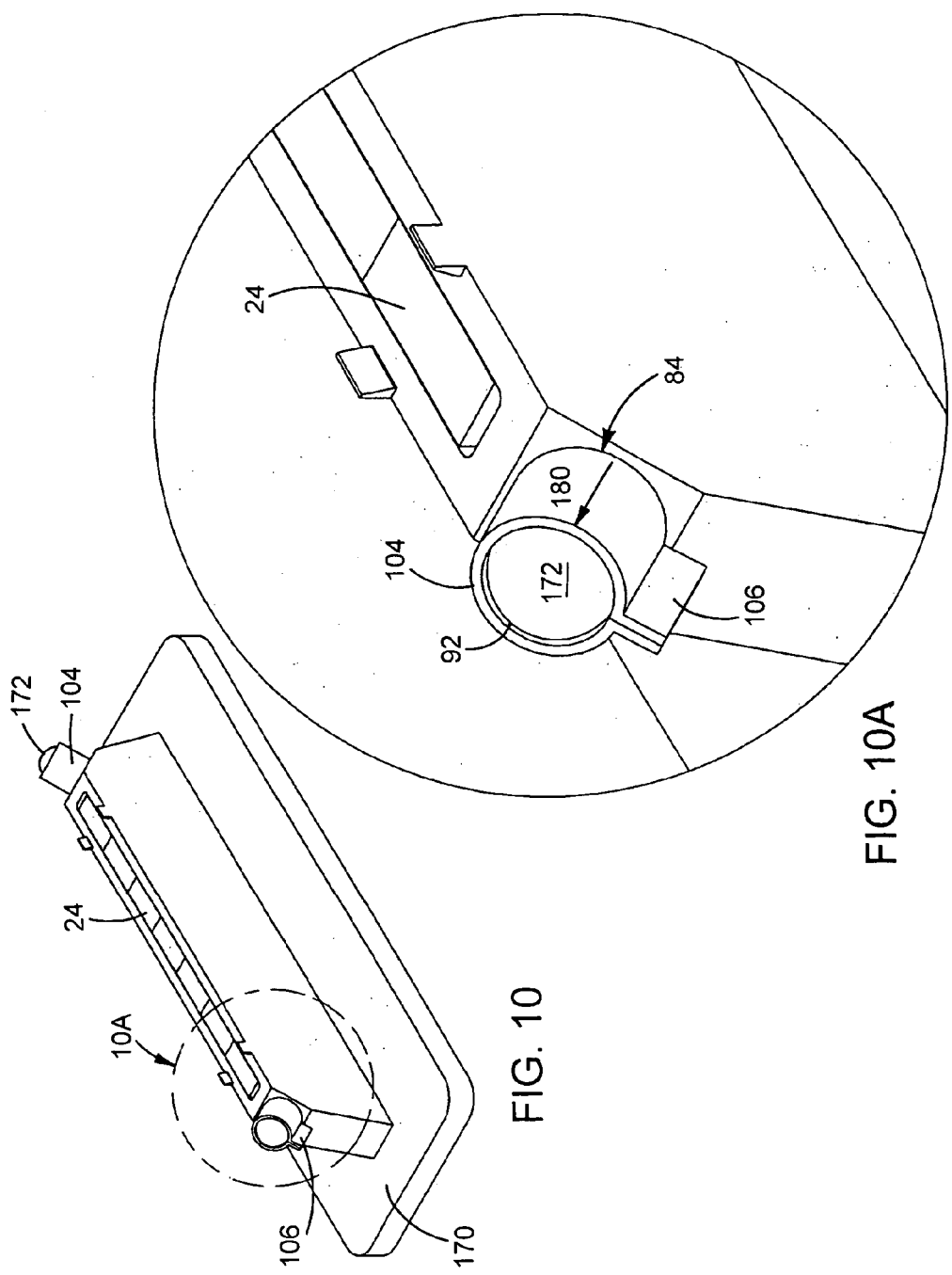

FASTENERS

TECHNICAL FIELD

This invention relates to fasteners, fastener components, and methods of making the same.

BACKGROUND

Arrays of molded male fastener elements, e.g., hooks are often formed integrally with a sheet-form base, to provide a sheet-form fastener component. This component can then be engaged with female fastener elements to form a "hook and loop" fastener. It is generally desirable that the fastener elements have good strength and toughness, so as to provide strong engagement during repeated use of the fastener.

Hook and loop fasteners have numerous applications, including the manufacture of automobile seats. In recent years, seats for cars and light trucks have been formed by molding a foam bun that will serve as the seat cushion, and then attaching a pre-stitched fabric cover to the foam bun. Often, the fabric cover is attached to the foam bun by insert molding touch fastener strips into the outer surface of the foam bun and attaching cooperating touch fastener strips to an inner surface of the fabric cover. Generally, the fastener strips are attached to the fabric cover along the seams where the cover is stitched together, and held in place by the seam stitching. The touch fastener strips allow the seat manufacturer to rapidly and semi-permanently attach the fabric cover to the foam bun by pulling the fabric cover over the foam bun and pressing the opposed touch fastener strips on the foam bun and fabric cover together.

The touch fastener strips on the foam bun are typically recessed in trenches, to allow the seams in the fabric cover to be indented below the surface of the seat cushion. Indenting the seams in this manner forms aesthetically appealing indented creases in the surface of the seat cushion upholstery for a tailored look. The trenches also accommodate the additional thickness of upholstery fabric that is created where the seam is stitched.

For example, a foam bun 10, shown in FIG. 1, includes a central, generally planar portion 12, and a pair of bolsters 14,16 disposed on either side of the central portion 12. The central portion 12, and bolsters 14,16 are separated by trenches 18 which define sweeping curves. Trenches 18 are located in the seat cushion at the point of change in curvature formed where the surface of bolsters 14,16 on the side of seat cushion 10 intersect central portion 12.

As shown in FIG. 2, touch fastener strips 24 are bonded to the bottom surface 17 of trenches 18, e.g., by insert molding the foam bun 10 onto the touch fastener strips 24 with hook elements 25 exposed for engagement with cooperative fastener strips 27 that are sewn to the fabric cover 29 along seams 31. Because the trenches 18 are indented below the surface 33 of the central portion 12, when the cooperative touch fastener loops 27 are pressed against the touch fastener strips 24 the double thickness of fabric 35 that is below seam 31 will be recessed in the trenches, resulting in a smooth outer surface at the seam area of the seat cover.

This attachment method works well for fabric covers having straight seams. However, if the fabric cover has seams that define sweeping curves, e.g., seams that have a curvature similar to that of trenches 18 in FIG. 1, problems can occur because as the touch fastener strip extends around the curve in the trench the strip will tend to buckle. Seat designs having curved seams have become increasingly popular in the automotive industry, and thus attempts have been made to address this problem. Some manufacturers have cut and pieced together short sections of straight touch fastener strips. Other manufacturers have cut out curved sections from wider strips of touch fastener material. Both methods can be inefficient, time consuming, can waste material, and can result in an undesirably high production cost.

In general, the attachment of a pre-stitched fabric cover to the foam bun requires considerable time, skill, and dexterity because space is tight, and alignment of the fabric over the bun is difficult, especially at trench edges 36 (FIG. 1).

There is a need in certain applications for fasteners that are simple to use, and when engaged, provide strength in a desired direction.

There is also a need to be able to consistently, and efficiently produce fastener components having differing functional characteristics, using techniques that require limited changeover in basic tooling, yet allow for adjustments to produce the desired fastener characteristics.

SUMMARY

According to one aspect of the invention, a fastener component for securing a loop-carrying member includes a tubular structure, and a plurality of discrete projections extending from a surface of the tubular structure. Each projection includes a molded stem of resin integral with the surface from which the projection extends, and a loop-engageable head formed at a distal end of the stem to overhang the surface. A majority of the projections are directed away from a common, open longitudinal end of the tubular structure to allow longitudinal overlap of the fastener component with a complementary loop-carrying member received from the longitudinal end, but to resist subsequent removal of the loop-carrying member toward the longitudinal end due to engagement of the projections.

In some embodiments, the surface is an inner surface, an outer surface, or both. In some implementations, the tubular structure is configured to be longitudinally bisected by two perpendicular planes intersecting along a center of the tubular structure, with each plane intersecting the tubular structure along two opposite sides of the tubular structure.

For some applications, the projections have a maximum height above the surface of less than about 0.025 inch (0.635 mm), e.g., less than less than 0.010 inch (0.254 mm). In applications when it is desired to place the tubular structure on a protrusion of a mold, and then to inject a moldable material into the mold to produce, for example, a foam bun, preferably the hooks have a maximum height above the surface of less than 0.005 inch (0.127 mm), to prevent intrusion of the moldable material into interior portions of the tubular structure.

In some implementations, the projections comprise molded hooks that each extend from the surface of the tubular structure to a distal tip. The distal tip is, for example, directed toward the surface of the tubular structure, to define a re-entrant crook. In some applications, the tip is spaced from the surface of the tubular structure by a distance of between about 0.001 inch to about 0.010 inch (0.0254–0.254 mm), e.g., about 0.003 inch to about 0.006 inch (0.0.0762–0.152 mm). For some applications, it is desirable for a back surface of each projection, directed away from the common, open longitudinal end of the tubular structure to form a ramp, free of loop-engaging features. When the projections are, for example, hooks, the back surface of the projections defines a ramp angle of greater than about 90 degrees, measured in side view toward the crook of the hook from a point where the stem of the hook raises up from the surface to a point of inflection proximate the distal end of the stem where the stem transitions to from the head to the hook. In some applications, it is desirable that the ramp angle is between about 90 degrees and about 120 degrees.

For some applications, the tubular structures comprises a cylinder defining two opposite, open ends. Other shapes, for example, hexagonal, octagonal, or conical in shape are possible. In some implementations, the projections are arranged in rows extending parallel to a longitudinal axis of the tubular structure, and the projections are arranged in a density of between about 500 to about 2000 hooks/inch$^2$ (77.5–210.0 hooks/cm$^2$).

In some instances, the tubular structure includes a sheet material forming the surface from which the projections extend, rolled into tubular form. When it is desirable to make a tubular structure that is laterally flexible so that an open end of the tubular structure can expand, the sheet material is annealed in shape so that the tubular structure defines a gap between longitudinal edges of the sheet material. The sheet material can further include molded ribs extending longitudinally from the surface of the tubular structure, along the longitudinal edges.

This is desirable when shut-off is needed against a protrusion in a mold to prevent flashing, or intrusion of a moldable material into inner portions of the tubular structure. In some instances, the ribs are formed of an elastomer.

In some embodiments, the tubular structure includes a longitudinal seam between previously opposite edges the sheet material. The longitudinal seam is formed, for example, between overlapped edges of the sheet material. The overlapped edges are, for example, bonded together, and/or the overlapped edges are tapered in thickness. In some instances, the opposite edges of the sheet material are joined by adhesive at the seam, for example, a flexible adhesive. In some implementation, the adhesive is places along the entire longitudinal seam, and for some applications, the adhesive is disposed about an end of the tubular structure.

According to another aspect of the invention, a seat cushion includes a seat bun formed of a compliant material defining a seating surface, and containing the fastener component of described above, with the common, open longitudinal end of the fastener component disposed at an outer surface of the bun, and a seat cover extending across the seating surface of the bun, and including a loop-carrying member inserted into the fastener component to secure the seat cover to the seat bun.

In some implementations the compliant material is a foam, for example, a foamed polyurethane. For some applications, the loop-carrying member extends from an inner surface of the seat cover. In some instances, the loop-carrying member includes a cylindrical plug extending from the inner surface of the seat cover.

According to another aspect of the invention, a method of forming a seat bun includes placing the fastener component described above on a protrusion in a mold such that projections are directed toward a distal end of the protrusion, and delivering a moldable material to the mold to form a molded seat bun containing the fastener component with the open end of the tubular structure disposed on a surface of the seat bun for receiving a loop-carrying member of a seat cover.

For some applications, for example, when it is desirable to prevent intrusion of the moldable material into inner portions of the tubular structure, a distal end of the protrusion includes a portion with a diameter larger than a nominal diameter between opposite projections of the tubular structure. In some instances, a projection-free region seals against the inner surface of the fastener component.

According to another aspect of the invention, a method of making a fastener component for securing a loop-carrying member includes forming a planar sheet of fastener material having a resin surface carrying a plurality of loop-engageable projections. Each projection includes resin stems formed integrally with the resin surface of the planar sheet material, and a loop-engageable head formed at a distal end of the stem to overhang the surface. A majority of the loop-engageable heads of the projections are oriented in a common direction toward a single edge of the planar sheet. The planar sheet of fastener material is formed into a tube. A majority of the projections directed away from a common, open longitudinal end of the tube. The tube form is secured.

In some implementations, the resin surface is, for example, part of an inside wall of the tubular structure. In some applications, the projections include molded hooks that each extend from the surface of the tubular structure to a distal tip. Each projection forms a ramp, free of loop-engaging features. In some instances, the projections are arranged in rows, extending parallel to a longitudinal axis of the tubular structure. In preferred implementations, the planar sheet material includes, in addition to loop-engaging projections, an elongate projection, for example, made of an elastomer that is at least as high as adjacent loop-engaging projections, running along each of two longitudinal edges of the planar sheet material.

In some embodiments, the loop-engageable projections are formed by molding stems ends integral with the surface, and then deforming stem ends to form loop-engageable heads.

For some applications, it is desirable to secure the fastener material in tube form with a stretchable material.

In preferred embodiments, as secured in the tube form, the fastener component defines a longitudinal gap between opposite edges of the sheet material.

The fastener components, and fasteners disclosed herein can be particularly useful in applications requiring high strength. For example, the fastener components disclosed herein can slide past a complementary loop-carrying member in a first direction, but resist subsequent disengagement in a second direction that is opposite the first direction.

The disclosed fastener components, and fasteners can be readily, and efficiently manufactured by modifications to known manufacturing techniques.

The details of one or more embodiments of the invention are set forth in the accompanying drawings and the description below. Other features, and advantages of the invention will be apparent from the description and drawings, and from the claims.

DESCRIPTION OF DRAWINGS

FIG. 3 is a perspective view of a sheet-form fastener component.

FIG. 3A shows the sheet-form fastener component of FIG. 3, beginning to form a tubular structure.

FIG. 3B shows the sheet-form fastener component shown of FIG. 3A as a tubular structure, the tubular structure defining a gap between longitudinal edges of the sheet material

FIG. 10 is a mold insert with protrusions.

FIG. 10A is an enlarged detailed view of area A of the mold insert of FIG. 10 shown in circle 10A.

DETAILED DESCRIPTION

Figure 1:
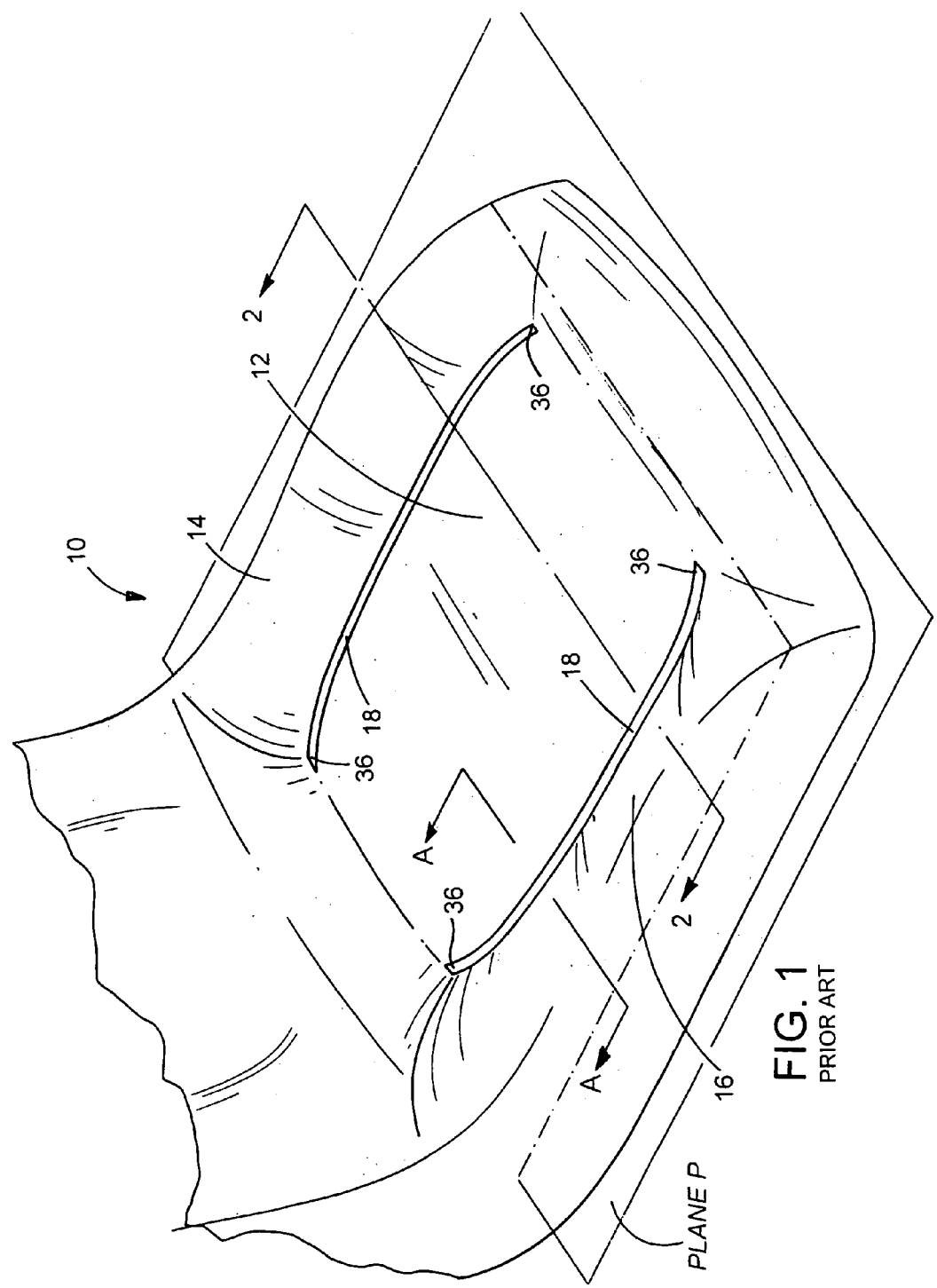
FIG. 1 is a schematic perspective view of a portion of a foam bun.
Figure 2:
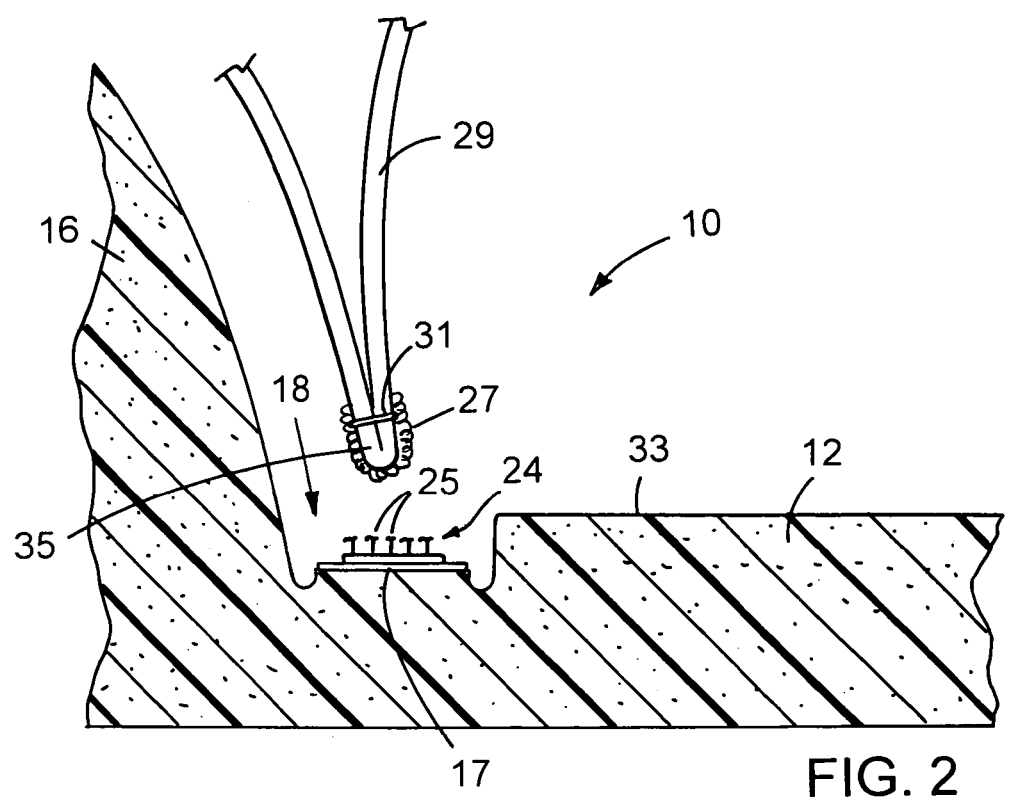
FIG. 2 is a highly enlarged cross-sectional view of a portion of the foam bun, taken along line 2—2 in FIG. 1, showing a prior art fastening system.

The fastener components, and fasteners disclosed below can be particularly useful in applications requiring high strength. Applications can include, for example, the manufacture of automobile seats.

Referring to FIG. 3, flexible fastener component 68 includes an array of engageable elements, for example, hooks 72, integrally molded with, and extending outwardly from one side of a sheet-form base 70. The engageable elements extend in rows in a first direction ($R_1$), and in a second direction ($R_2$) that is perpendicular to the first direction. The engageable elements each include an engageable side 80, and a non-engageable side 78 disposed opposite the engageable side. Preferably, the elements are substantially identical to each other, as shown.

The engageable elements may be formed by a process having a machine direction (MD), and a cross-machine direction (CD), in which case the engageable elements may be arranged with rows extending in the machine direction ($R_1$), and the cross-machine direction ($R_2$) so that engageable sides 80 face uni-directionally in the machine direction. The rows of hooks 72 are spaced apart from each other by spacing S in the cross-machine direction (CD), running from a proximal side 74 to a distal side 76. Processes for forming component 68 will be described further below.

In some embodiments, fastener component 68 is made of thermoplastic material. Suitable thermoplastic materials include polyethylenes, polypropylenes, polyamides, and polyesters. In other embodiments, especially when high chemical resistance and/or high temperature stability is required, fastener component 68 is made of a thermoset material. Suitable thermoset materials include natural rubbers, synthetic rubbers, and rigid, or flexible polyurethanes.

Figure 3C:
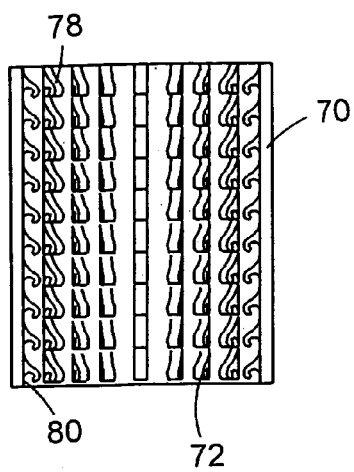
FIG. 3C is a cross-sectional view of the fastener component shown in FIG. 3B, taken along 3C—3C.

Referring to FIG. 3A, the proximal side of fastener component 68 is wrapped towards the distal side 76. Referring to FIGS. 3B, and 3C, drawing even closer the proximal side 74 towards the distal side 76 forms a tubular structure with an open first end 84, an open second end 92, a gap 86, an inside 88, and an outside 90. Engageable elements are arranged so that engageable sides 80 face uni-directionally in the machine direction pointing from the open first end 84 toward the open second end 92.

Figure 3D:
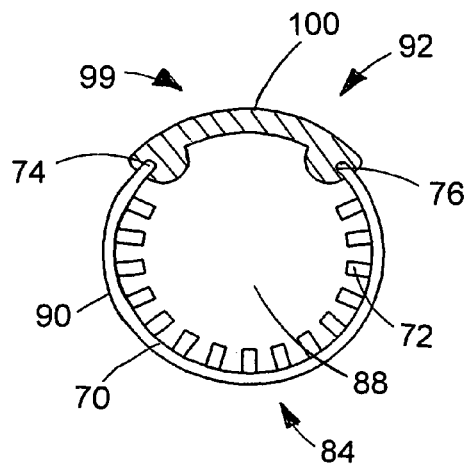
FIG. 3D is an end view of the fastener component shown in FIG. 3B, secured with a flexible material.
Figure 3E:
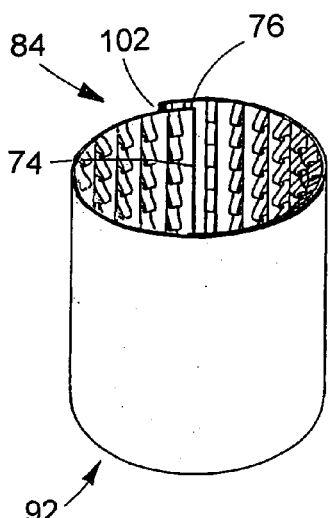
FIG. 3E is a perspective side view of the fastener component shown in FIG. 3B, illustrating overlapping edges.
Figure 3F:
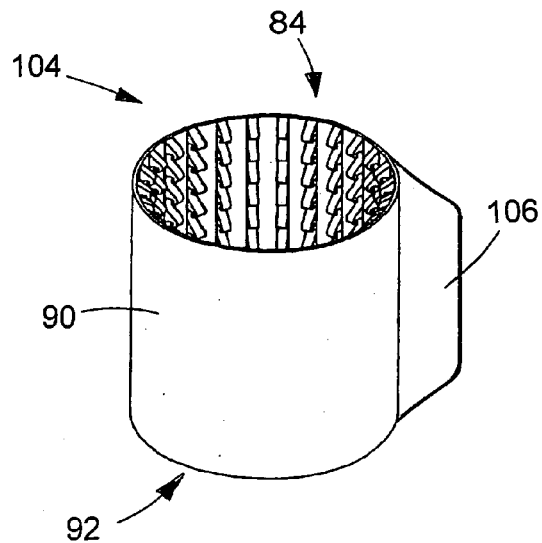
FIG. 3F is a perspective view of the fastener component shown in FIG. 3B, after thermal fixing to form a tab.

FIGS. 3D–3F illustrate different ways of fixing the proximal side 74, and the distal side 76. In one embodiment (FIG. 3D), an adhesive 100, for example, an elastomeric adhesive, is used to fill gap 86, and to fix the proximal and distal sides 74, 76. The elastomeric adhesive 100 provides radial flex to the tubular fastener component 99, which allows fastener component 99 to be placed onto over-sized objects, for example, protrusions in a mold with a larger diameter than component 99. The elastomer adhesive 100 may run the entire longitudinal length of the fastener 99, or it may be used in select locations (for example, top, middle and bottom) along the longitudinal length of fastener component 99. In another embodiment, proximal and distal sides 74, 76 are fixed by sealing with an thermal sealer, for example, an impulse sealer. In one implementation (FIG. 3E), sliding proximal side 74 inside of the distal side 76, creates an area of overlap 102. The area of overlap 102 may be sealed using an impulse sealer, or an ultrasonic welder. Sealing can be done along the entire longitudinal length of the overlap area 102, or it may be sealed in select locations (for example, top, middle and bottom). In yet another implementation, thermal sealing is performed so that tubular fastener component 104 with tab 106 is created. Fastener component 104 is useful when it is desired to mold-in the fastener component. Tab 106 can provide mechanical bonding to the molded substrate and can prevent rotation of the fastener component in the molded article. More than a single tab can be fabricated on a tubular fastener. For example, two, three, or more, tabs may be fabricated. Trimming of tab 104 can be accomplished by die cutting and other methods known in the art. In yet another embodiment, the shape of the tubular fastener is fixed in the shape shown in FIG. 3B by heating the sheet-form base on the side opposite the engageable elements, and then holding in the shown configuration until the sheet-form base cools, thereby permanently setting the shape of FIG. 3B. This embodiment acts like a "spring" in that it the fastener component has radial flex which allows the fastener component to be placed onto over-sized objects, for example, protrusions in molds with a larger diameter than the fastener component.

Figure 4:
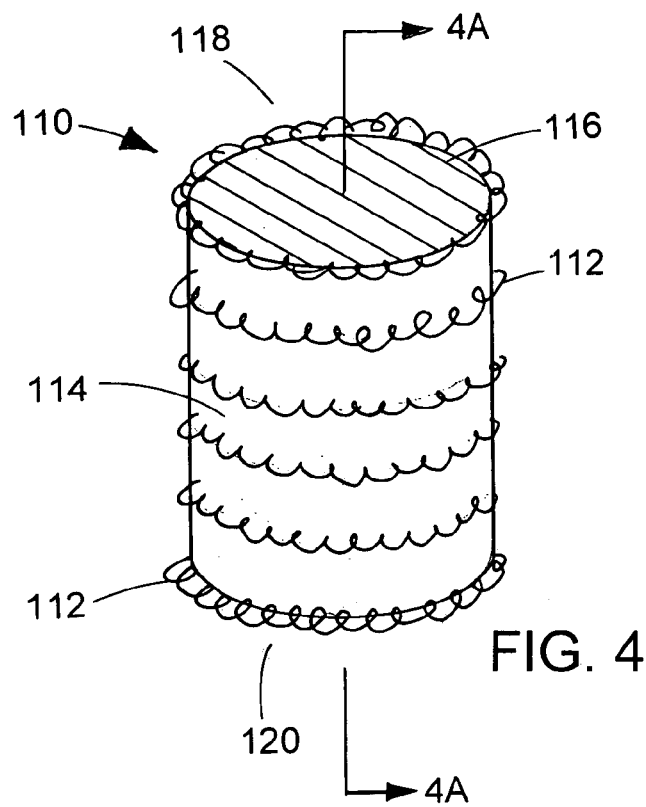
FIG. 4 is a perspective view of a male loop-carrying component.
Figure 4A:
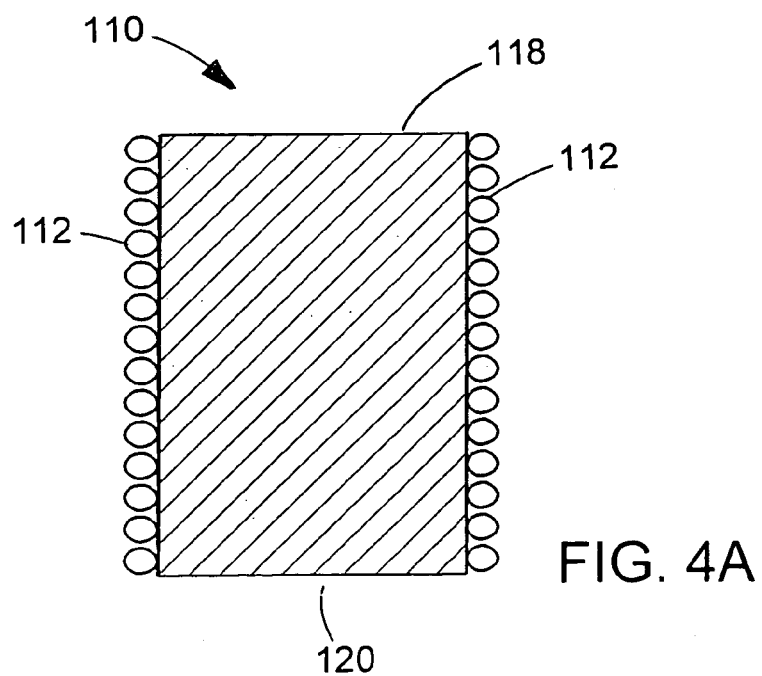
FIG. 4A is a cross-sectional view of the male core shown in FIG. 4, taken along 4A—4A.

While FIGS. 3B–3F represent an engageable hook-containing female component of a fastener system, FIGS. 4–4A represent the engageable loop-containing male portion. Male portion includes a core 110 that carries loops 112. The core 110 of the male portion has an outer surface 114, a solid body 116, a first end 118 and a second end 120. While core 110 is solid in FIG. 4A, the core may be hollow. In some embodiments, the hollow core may be filled with, for example, a foam, or a rubber.

Figure 5:
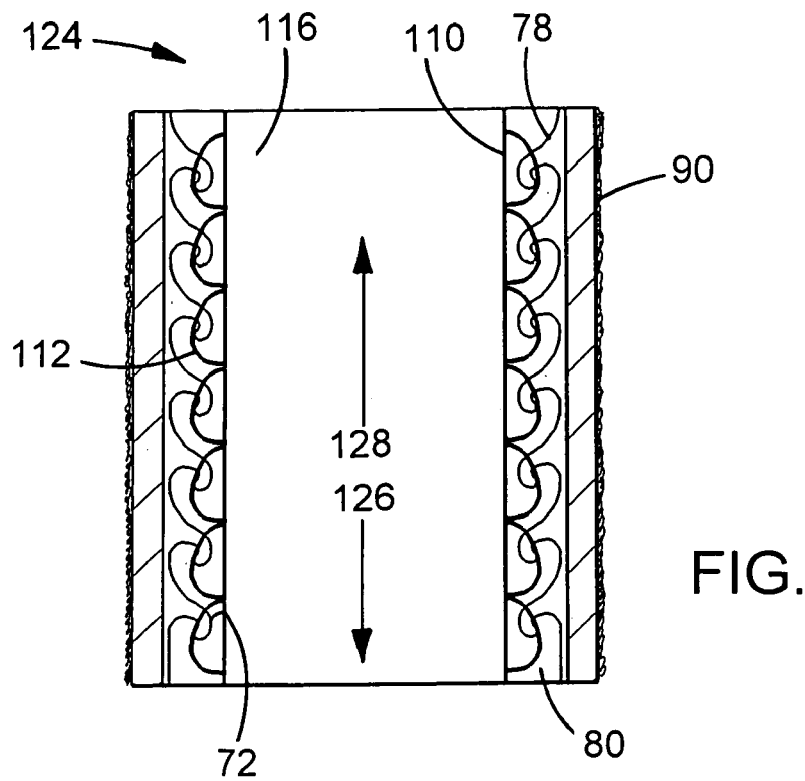
FIG. 5 is a cross-sectional view of a complete tubular hook, and loop fastener.

Referring to FIG. 5, an engaged hook and loop fastener system 124 is shown in cross-sectional view. To make the system 124, either end 118, or 120 of the male portion is inserted into the first open end 84 of the female tubular fastener 104 (FIG. 3F). Inserted in this manner in direction 126, very little resistance is encountered. Once in place, hooks 72 lock to loops 112.

Removal of male portion from the female tubular fastener 104 in a direction 128 would generally require breaking hooks 72 and/or loops 112, or cycling hooks, and/or loops. In order for male portion to fit inside a female tubular fastener 104, the male portion core generally needs to have a smaller diameter than the inner diameter of the female fastener 104. A difference of about 1–3 mm between the outside diameter of the male portion core and the inside diameter of the female tubular fastener (excluding hooks) is typical. If male portion core is too small, the bond may be too weak, and if the male portion is too big, it may be difficult to fit the male portion into the female tubular fastener. Of course, if the female tubular fastener component utilizes an elastomeric adhesive 100 to seal gap 86, larger size cores may be utilized due to the flexibility provided by the elastomer.

Figure 6:
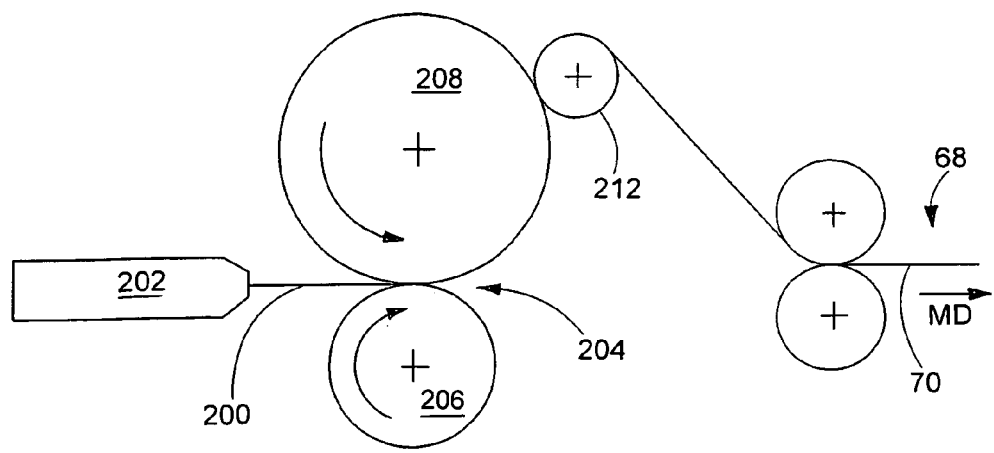
FIGS. 6 and 6A illustrate alternate molding processes for forming the fastener component illustrated in FIG. 3.

Referring to FIG. 6, a process for making fastener component 68 includes extruding thermoplastic resin 200 from extruder 202 into a nip 204 formed between a pressure roll 206 and a counter-rotating mold roll 208 that defines fastener element-shaped cavities in its surface.

Pressure in the nip causes thermoplastic resin 200 to enter these blind-ended forming cavities to form the fastener elements, while excess resin remains about the periphery of the mold roll and is molded between the rolls to form sheet-form base 70. The thermoplastic resin is cooled as it proceeds along the periphery of the mold roll, solidifying the fastener elements, until it is stripped by stripper roll 212. The molded fastener elements distend during de-molding, but tend to recover substantially their as-molded shape. The direction of travel of the material illustrated in FIG. 6 is referred to as the "machine direction" (MD) of the material and defines the longitudinal direction of the resulting product, while the cross-machine direction (CD) is perpendicular to the machine direction within the plane of the sheet-form base. Further details regarding processing are described by Fischer, U.S. Pat. No. 4,775,310 and Clune et al., U.S. Pat. No. 6,202,260, the disclosures of which are hereby incorporated in full by reference, herein.

In some embodiments the mold roll 208 is formed by a face-to-face assembly of thin, circular plates, of thickness, for example, between about 0.025 inch and 0.250 inch (0.635–6.35 mm). Some of the plates referred to as "mold rings" have cutouts in their circular peripheries to define mold cavities while others, referred to as spacer rings, have smooth circular peripheries. The sides of the spacer rings serve to close the open sides of the cutout mold cavities and to serve to create the row spacing S between rows of molded features, see, for example, the lateral spacing S between rows of projections, FIG. 3. A mold roll may have an axial length L, for example, from about 0.75 inch to about 24 inches (1.91–60.96 mm), or more, and may comprise, for example, from about 50 or 1000 or more individual mold and spacer rings.

Figure 6A:
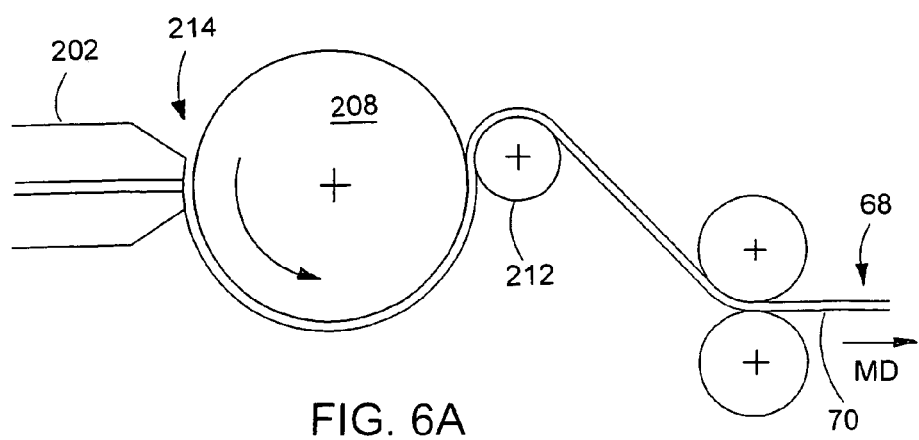

An alternate process for making fastener component 68 is illustrated is shown in FIG. 6A. The process is similar to that described above with reference to FIG. 4, except only a mold roll 208 is used, i.e., no pressure roll 206 is necessary. Here, the extruder 202 is shaped to conform to the periphery of the mold roll 208 and the extruded resin 200 is introduced under pressure directly to a gap 214 formed between mold roll 208 and extruder 202. The molded fastener component is stripped from the mold cavities by a stripper roll 212 as described above. Further details regarding this process are described by Akeno, U.S. Pat. Nos. 5,781,969, and 5,913,482, the disclosures of which are hereby incorporated in full by reference, herein.

Figure 7:
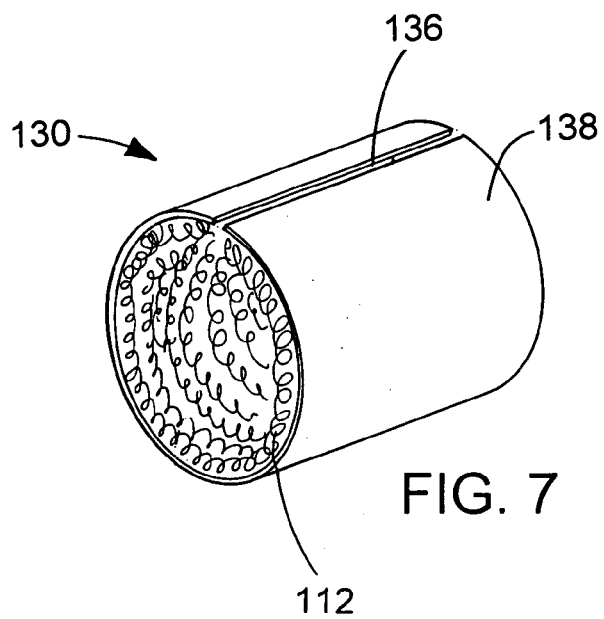
FIG. 7 is a perspective front-view of a female tubular fastener component with loops.
Figure 7A:
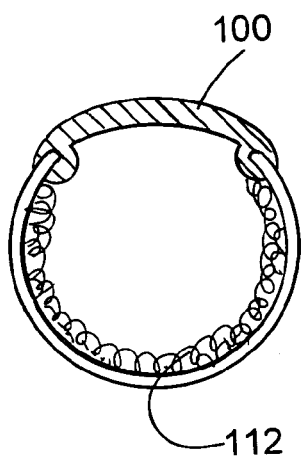
FIG. 7A is a front view of a fastener component similar to that shown in FIG. 3D, but containing loops as engaging elements.

Referring to FIG. 7, an alternative female portion 130 is shown that is similar to that of FIG. 3B, except the engageable elements are loops 112. Female portion 130 is made by, for example, wrapping a sheet-form loop-carrying material. Female component 130 can be fixed as described above. For example, female component 130 can be fixed by using an elastomeric adhesive 100 (FIG. 7A). The elastomeric adhesive 100 may run the entire longitudinal length of the fastener component, or it may be used in select locations (e.g. top, middle and bottom) along the longitudinal length of fastener component.

Figure 9:
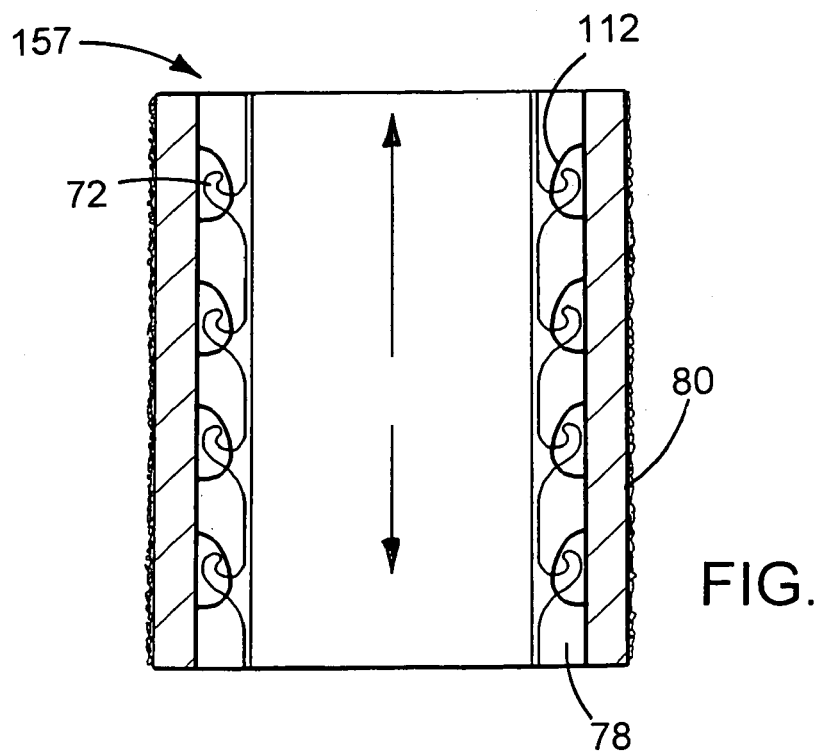
FIG. 9 is a fastener system.
Figure 8:
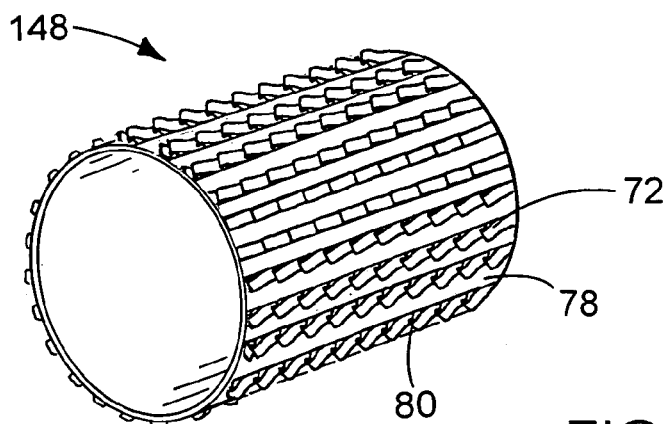
FIG. 8 is a perspective front-view of a male tubular fastener component with hooks on an outer surface.

Referring to FIG. 8, male tubular fastener component 148 has hooks 72 that run in a uni-directional fashion along an outer surface of male tubular component 148. Referring now to FIG. 9, an engaged hook, and loop fastener system 157 is made by inserting male portion 148 into the corresponding female portion, similar to that discussed in reference to FIG. 5.

The fastener components, and fasteners discussed above can be particularly useful in applications requiring high strength. As an example, automobile seats can be manufactured with female portions 104 molded into a foam bun. Referring now to FIGS. 10–10A, female portions 104 can be molded into a foam bun by first placing female portions 104 with tabs 106 onto protrusions 172 emanating from a mold insert 170. Also on insert 170 are additional strip touch fasteners 24, oriented so that the hooks face the surface of the mold insert 170. FIG. 10A is an enlarged view of the protrusion region of the mold insert 170 and shows the orientation of fastener 104 on protrusion 172. Fastener 104 is oriented so that the first open end 84 butts up against mold insert 170. The engageable sides of the hooks (not shown) run from the first open end 84 toward the second open end 92 in direction 180 so that they will face away from the open end of the female fastener component in the finished molded product. The protrusion can be magnetized, and the fastener component can be filled with a magnetic material (for example, iron particles) so that it stays put on the mold protrusion when a visco-elastic material is introduced into the mold. Magnetically attractive fasteners are described in U.S. Pat. Nos. 6,129,970 and 5,945,193, the disclosure of each is hereby incorporated in full by reference herein. Molded-in fasteners are described in U.S. Pat. No. 5,766,723, the disclosure of which is hereby incorporated in full by reference herein.

Figure 11:
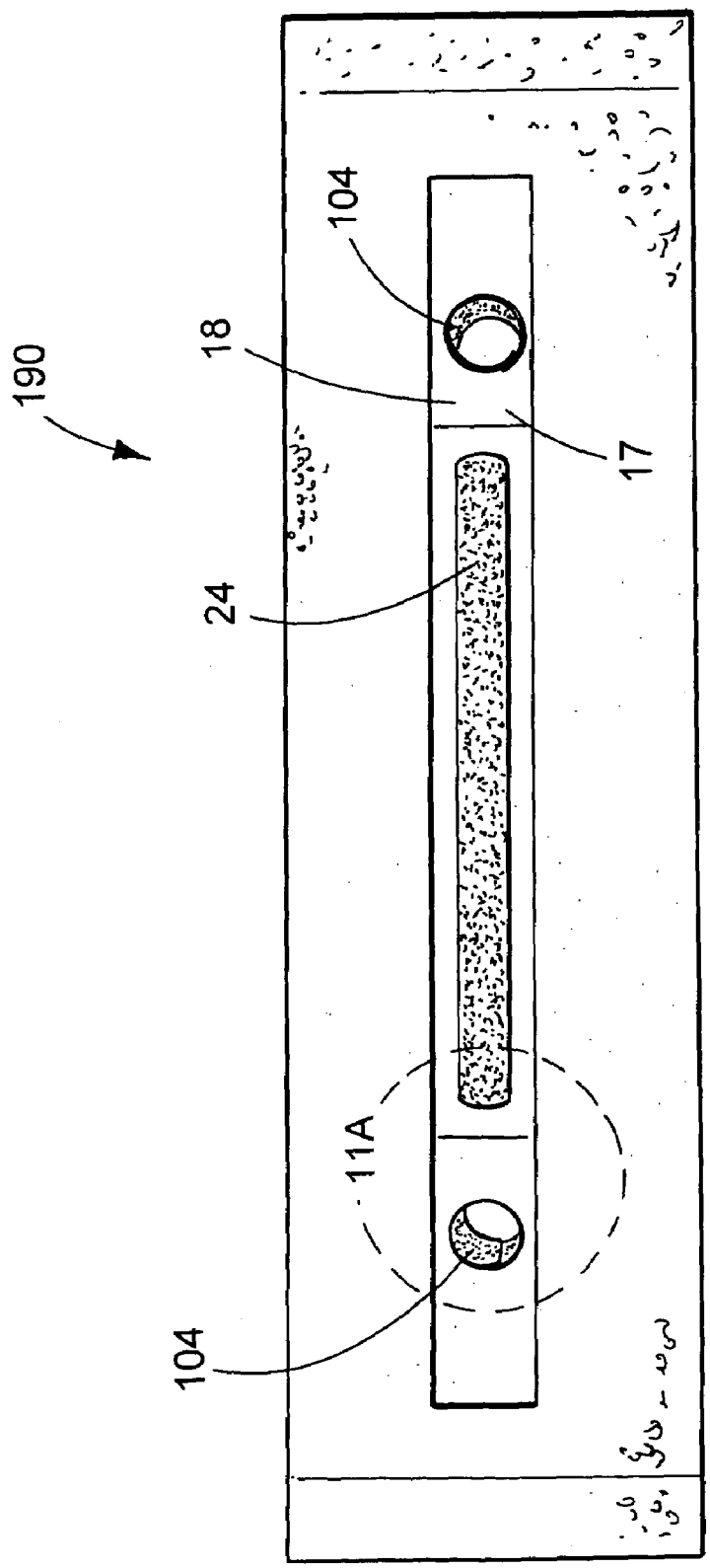
FIG. 11 is a perspective top view showing a portion of a foam bun with molded-in tubular fastener components.
Figure 11A:
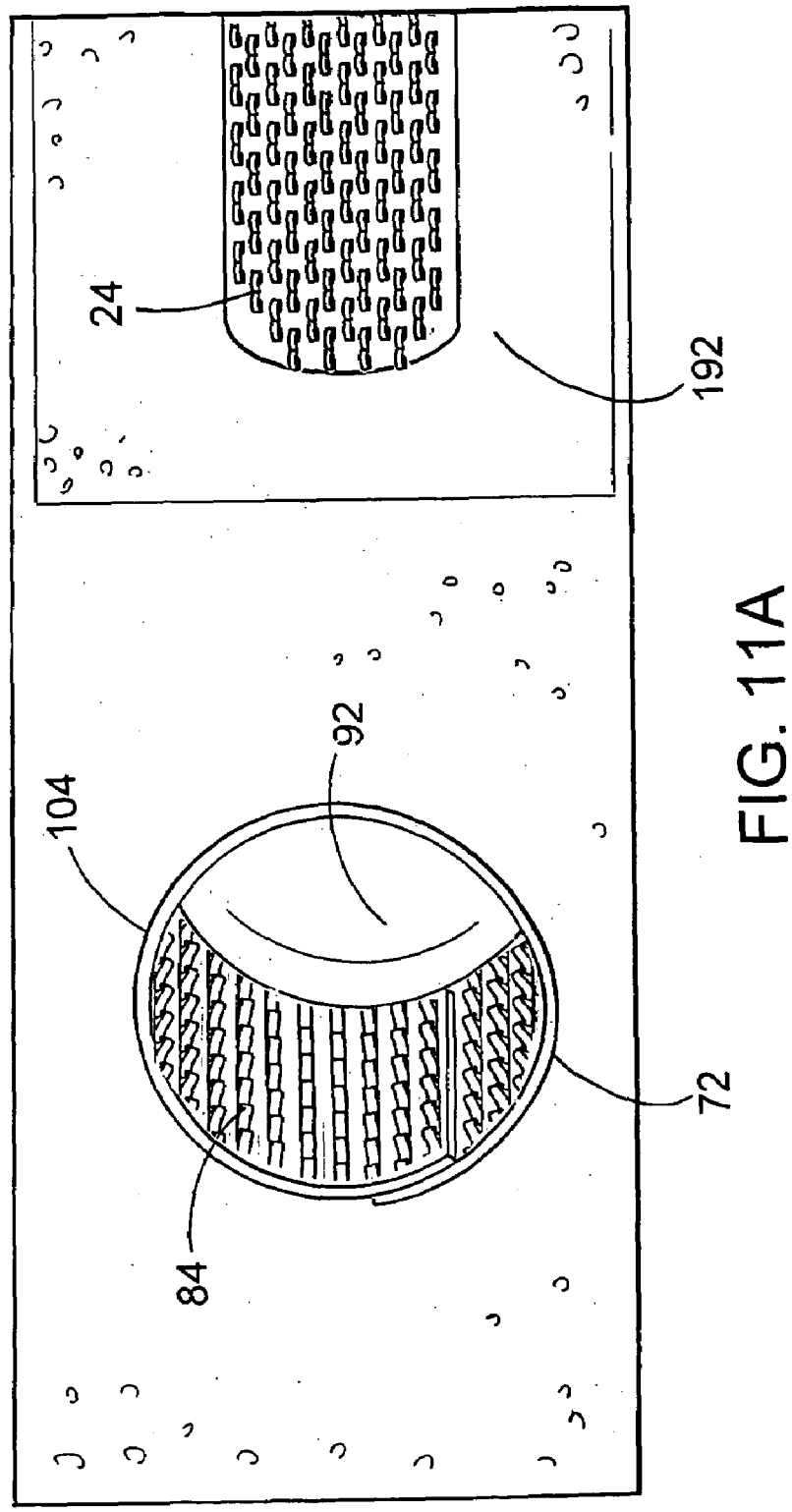
FIG. 11A is an enlarged detail view of the area of the bun of FIG. 11 shown in circle 11A.

FIGS. 11–11A show a portion of a foam bun 190 formed by injecting foam into a mold (not shown) containing insert 170. Female fastener component 104 is molded in the bottom surface 17 of trenches 18. The strip of additional touch fasteners 24, is oriented in the molded bun so that the hooks are exposed for engagement. FIG. 11A shows the region around fastener 104 in a little more detail. The open first end 84 is closest to the viewer and the open second end 92 (now closed) is farther away. Hooks 72 are oriented runs so that the engageable sides point from the first end 84 to the second end 92. FIG. 11A also shows the additional touch fasteners 24 in more detail and illustrates that hooks 192 on strip 24 may be different from hooks 72 on the inside of tubular fastener 104. Hooks 192 may be, for example, palm-tree hooks or flat-top hooks. If the height of the hooks is too large, foam may flash into the hook engaging region, and if the hooks are not high enough, engagement may be too low, as will be discussed further below. Hook density is approximately 300 hooks/in$^2$ (46.5 hooks/cm$^2$), or more, e.g., 500, 700, 1000, 1300, 1700 hooks/in$^2$ (77.5, 108.5, 155.0, 201.5, 263.5 hooks/cm$^2$), or more, e.g., 2000 hooks/in$^2$ (310.0 hooks/cm$^2$). However, many other configurations are possible. The thickness of the sheet-form base is approximately 0.003 inch (0.0762 mm), or more, e.g., 0.005, 0.007, 0.010, 0.020, 0.050 inch (0.127, 0.178, 0.254, 0.508, 1.27 mm), or more, e.g., 0.10 inch (2.54 mm). In one embodiment, the outer diameter of tubular fastener 104 is about 15 mm, while the length of tubular fastener 104 is about 20 mm. Of course, the female tubular component molded into bun 190 could be a female tubular fastener component with loops as engageable elements.

Figure 12:
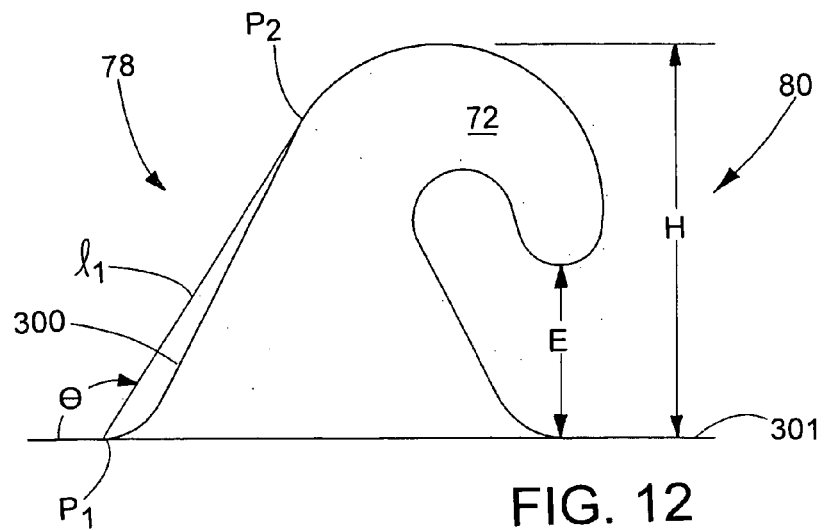
FIG. 12 is an enlarged side view of a J-style hook illustrating ramp angle, hook height, and crook entrance height.

Referring to FIG. 12, and back to FIG. 3B, hook 72 includes a back surface 300 that is directed away from the common, open longitudinal end of the tubular structure, and forms a ramp, free of loop-engaging features. The back surface 300 defines a ramp angle θ of greater than about 90 degrees, measured in side view from a top surface 301 toward a line $1_1$ that is defined from a point $P_1$, where the stem of the hook rises up from the top surface 301, to a point of inflection $P_2$, proximate the distal end of the stem, where the projection transitions from stem to head. In some embodiments, the ramp angle is between about 90 degrees, and about 120 degrees. A relatively high ramp angle allows loops of a loop-carrying material to slide past the back surface 300 relatively easily, but firmly engage in the opposite direction. The height H of the hook, and the crook entrance height E is measured perpendicular base 70. When tubular fastener components, such as component 104 of FIG. 3F, are molded into a substrate, e.g., a foam bun, the height H of the hooks is generally minimized to avoid excessive longitudinal intrusion of material into inner portions of the tubular structure. To prevent intrusion, preferably, hooks have a maximum height above the top surface 301 of less than 0.025 inch (0.635 mm), e.g., 0.010 inch (0.254 mm), or less, e.g., less than 0.005 inch (0.127 mm), and the entrance height E is from about 0.001 inch to about 0.010 inch (0.0254–0.254 mm), e.g., between about 0.003 inch to about 0.006 inch (0.0.0762–0.152 mm).

Figure 13:
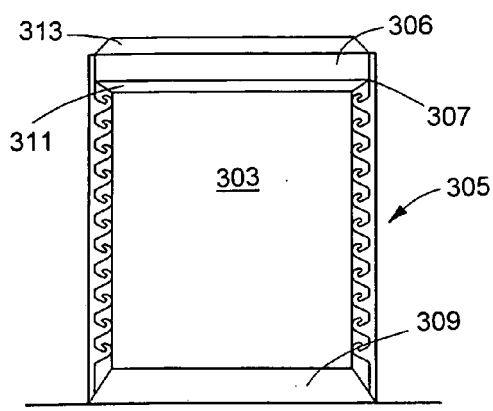
FIG. 13 is a cross-sectional view of a tubular fastener component on a mold protrusion, a portion of the mold protrusion having a diameter larger than the nominal diameter of the fastener component, and the tubular fastener component including a region without projections.

Referring to FIG. 13, and back again to FIG. 10, in addition to minimizing the height of the hooks, another way to minimize intrusion of material longitudinally into inner portions of the tubular structure is to provide a mold protrusion 303 that includes a distal end portion 306 with a diameter larger than a nominal diameter the tubular structure 305. The tubular structure 305 has a projection-free region 307 that seals against distal end portion 306. The proximal end of protrusion 303 contains a tapered portion 309 for sealing the opposite end of tubular structure 305. Distal end portion 306 of protrusion 303 includes a tapered lead-in 313, and a tapered lead-off 311 to allow fastener component 305 to be easily placed onto, and removed from protrusion 303.

Figure 14:
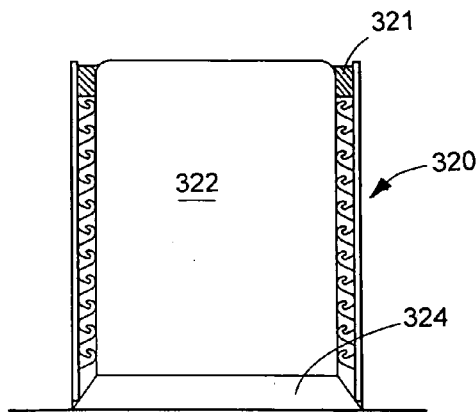
FIG. 14 is a cross-sectional view of a tubular fastener component on a mold protrusion, the fastener component including a seal about an inner surface of the tubular structure.

Referring to FIG. 14, yet another way to minimize intrusion of material longitudinally into inner portions of a tubular structure is to provide a tubular fastener 320 that includes a resilient material, e.g., an elastomer, that forms a seal 321 at a distal end of the fastener component. The proximal end of the tubular structure 320 is sealed by tapered portion 324 on protrusion 322, as discussed above.

Figure 15:
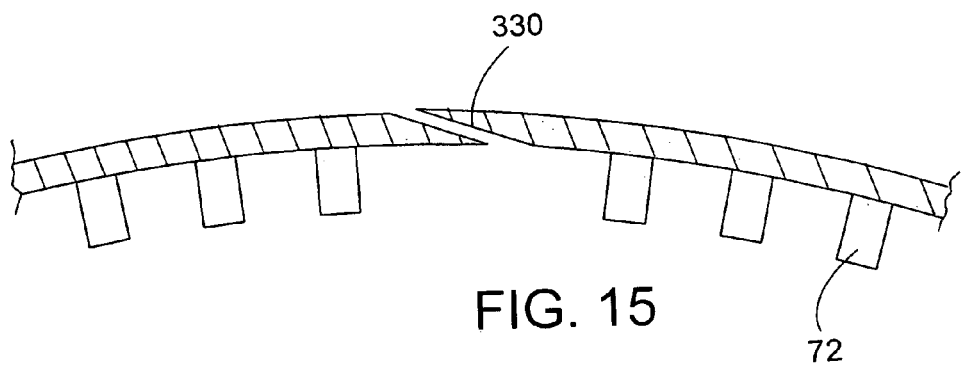
FIG. 15 is a cross-sectional view of a portion of a tubular fastener component showing overlapped edges that are tapered in thickness.
Figure 16:
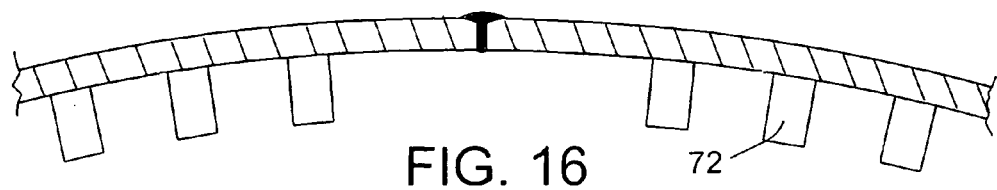
FIG. 16 is a cross-sectional view of a portion of a tubular fastener component showing edges that have been bonded.

Referring to FIGS. 3D, 3F, and 16, radial intrusion of material into inner portions of a tubular structure can be minimized, for example, by longitudinally sealing the tubular structure with an elastomer 100 (FIG. 3D), by thermally fusing previously opposite edges so that a tab 106 is formed (FIG. 3F), or by thermally fusing previously opposite edges in face-to-face manner (FIG. 16). Referring to FIGS. 3E, and 15, other methods of preventing radial intrusion of material include overlapping opposite edges (FIG. 3E), and overlapping, tapered edges (FIG. 15).

Figure 17:
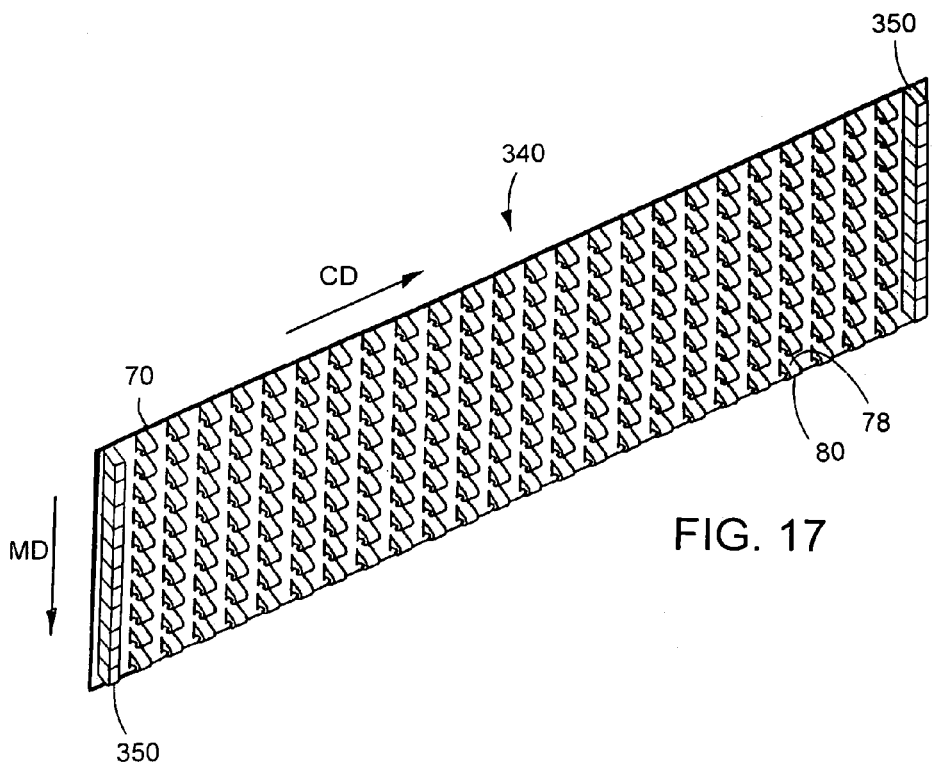
FIG. 17 is a perspective view of a sheet-form fastener component including molded ribs extending longitudinally from the fastener component, along longitudinal edges.

Referring to FIG. 17, yet another way to prevent radial intrusion is to mold a fastener component 340 that includes, in addition to loop-engaging projections, elongate projections 350 running along each of two longitudinal edges of the planar sheet material. When forming the molded component into a tubular structure, and annealing the material to maintain the tube form, the projection 350, being dense, or solid, prevents, or reduces radial intrusion.

Figure 18:
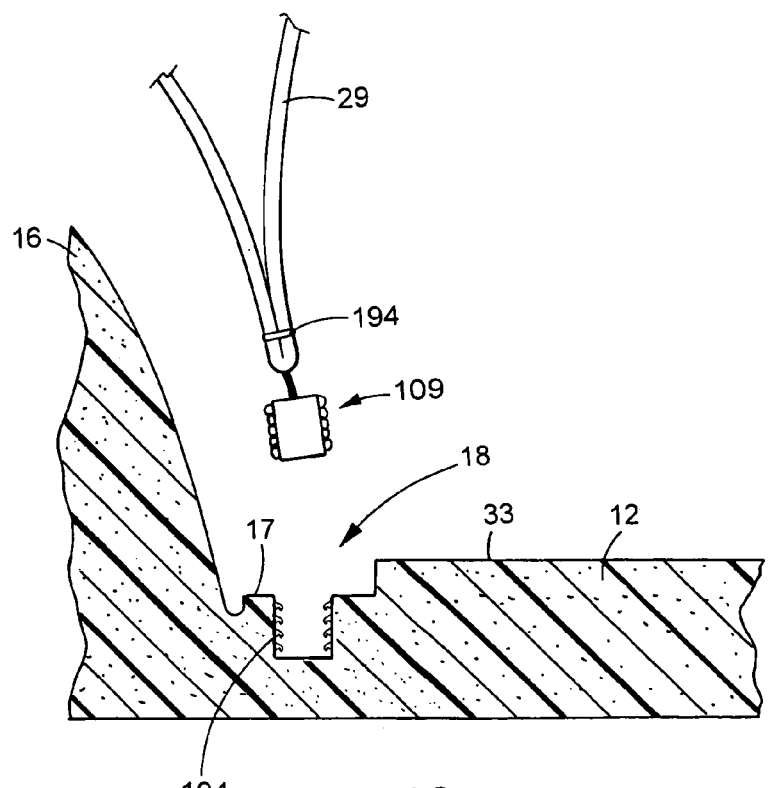
FIG. 18 illustrates attachment of a seat cover to a foam bun using molded-in tubular fastener components.
Figure 19:
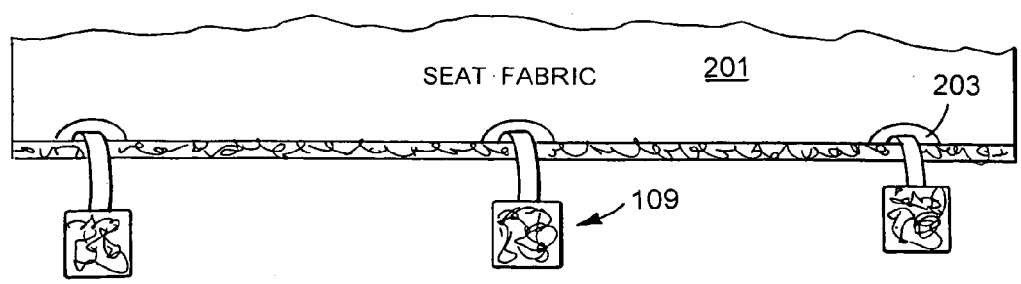
FIG. 19 illustrates a seat cover with longitudinally adjustable loop-carrying male fastener components.

Referring to FIG. 18, attachment of a pre-stitched fabric cover to a foam bun is accomplished by sewing male portion 109 into fabric cover 29 and molding female portion 104 into the foam bun. Inserting male portion into female portion creates a fastening system similar to that shown in FIG. 5. In other embodiments, the male portion contains hooks and the female portion contains loops, resulting in a fastening system similar to that shown in FIG. 9. Referring to FIG. 19, to more easily allow alignment of male portion 109 above female portion 104 that is molded into a foam bun, it can be advantageous to fix male portions 109 onto a seat fabric 201 that includes cut-outs 203. Cut-outs 203 allow for positional adjustment of male portions 109 along the seat fabric 201.

While the tubular fasteners shown have been cylindrical, other shapes are possible. For example, the tubular fasteners described herein can be hexagonal, octagonal, or conical in shape.

Accordingly, other embodiments are within the scope of the following claims.

What is claimed is:

1. A fastener component for securing a loop-carrying member, the fastener component comprising:
   a tubular structure having a joint extending longitudinally along the tubular structure; and
   a plurality of discrete projections extending from an inner surface of the tubular structure, each projection including a molded stem of resin integral with the inner surface of the tubular structure from which the projection extends, and a loop-engageable head formed at a distal end of the stem to overhang the inner surface,
   a molded rib extending longitudinally from the inner surface of the tubular structure,
   wherein a majority of the projections are directed away from a common, open longitudinal end of the tubular structure to allow longitudinal overlap of the fastener component with a complementary loop-carrying member received from the common longitudinal end, but to resist subsequent removal of the loop-carrying member toward the common longitudinal end due to engagement of the projections.

2. The fastener component of claim 1, wherein the tubular structure is configured to be longitudinally bisected by two perpendicular planes intersecting along a center of the tubular structure, with each plane intersecting the tubular structure along two opposite sides of the tubular structure.

3. The fastener component of claim 1, wherein the projections have a maximum height above the inner surface of less than 0.025 inch (0.635 mm).

4. The fastener component of claim 3, wherein the projections have a maximum height above the inner surface of less than 0.010 inch (0.254 mm).

5. The fastener component of claim 4, wherein the projections have a maximum height above the inner surface of less than 0.005 inch (0.127 mm).

6. The fastener component of claim 1, wherein the projections comprise molded hooks that each extend from the inner surface of the tubular structure to a distal tip.

7. The fastener component of claim 6, wherein the distal tip is directed toward the inner surface of the tubular structure, to define a re-entrant crook.

8. The fastener component of claim 7, wherein the tip is spaced from the inner surface of the tubular structure by a distance of between about 0.001 inch to about 0.010 inch (0.0254–0.254 mm).

9. The fastener component of claim 8, wherein the tip is spaced from the inner surface of the tubular structure by a distance of between about 0.003 inch to about 0.006 inch (0.0.0762–0.152 mm).

10. The fastener component of claim 6, wherein a back surface of each projection, directed toward the common, open longitudinal end of the tubular structure forms a ramp, free of loop-engaging features.

11. The fastener component of claim 10, wherein the back surface of the projections defines a ramp angle of greater than about 90 degrees, measured in side view toward the crook of the hook from a point where the stem of the hook raises up from the surface to a point of inflection proximate the distal end of the stem where the stem transitions to from the head to the hook.

12. The fastener component of claim 11, wherein the ramp angle is between about 90degrees and about 120 degrees.

13. The tubular structure of claim 1, wherein the tubular structures comprises a cylinder defining two opposite, open ends.

14. The tubular structure of claim 1, wherein the projections are arranged in rows extending parallel to a longitudinal axis of the tubular structure.

15. The fastener component of claim 1, wherein the projections are arranged in a density of between about 500 to about 2000 hooks/inch$^2$ (77.5–210.0 hooks/cm$^2$).

16. The fastener component of claim 1, wherein the rib is formed of an elastomer.

17. The fastener component of claim 1, wherein the joint comprises an adhesive.

18. The fastener component of claim 17, wherein the adhesive is flexible.

19. The fastener component of claim 1, wherein the tubular structure has more than a single joint extending longitudinally along the tubular structure.

20. The fastener component of claim 1, wherein the joint is contiguous extending longitudinally along the tubular structure.

21. The fastener component of claim 1, wherein the joint comprises a material from which the tubular structure is made.

22. A seat cushion comprising:
a seat bun formed of a compliant material defining a seating surface, and containing a fastener component comprising
a tubular structure and
a plurality of discrete projections extending from a surface of the tubular structure, each projection including a molded stem of resin integral with the surface from which the projection extends, and a loop-engageable head formed at a distal end of the stem to overhang the surface, wherein a majority of the projections are directed away from a common, open longitudinal end of the tubular structure to allow longitudinal overlap of the fastener component with a complementary loop-carrying member received from the longitudinal end, but to resist subsequent removal of the loop-carrying member toward the longitudinal end due to engagement of the projections, with the common, open longitudinal end of the fastener component disposed at an outer surface of the bun; and
a seat cover extending across the seating surface of the bun, and including a loop-carrying member inserted into the fastener component to secure the seat cover to the seat bun.

23. The seat cushion of claim 22, wherein the compliant material is a foam.

24. The seat cushion of claim 22, wherein the loop-carrying member extends from an inner surface of the seat cover.

25. The seat cushion of claim 22, wherein the loop-carrying member comprises a cylindrical plug extending from the inner surface of the seat cover.

26. A fastener component for securing a loop-carrying member, the fastener component comprising:
a tubular structure having a joint extending longitudinally along of the tubular structure;
a plurality of discrete projections extending from a surface of the tubular structure, each projection including a molded stem of resin integral with the surface from which the projection extends, and a loop-engageable head formed at a distal end of the stem to overhang the surface; and
a molded rib formed of an elastomer extending longitudinally from the surface of the tubular structure,
wherein a majority of the projections are directed away from a common, open longitudinal end of the tubular structure to allow longitudinal overlap of the fastener component with a complementary loop-carrying member received from the longitudinal end, but to resist subsequent removal of the loop-carrying member toward the longitudinal end due to engagement of the projections.

* * * * *